US012760434B2

(12) United States Patent
Kornbluth et al.

(10) Patent No.: US 12,760,434 B2
(45) Date of Patent: Oct. 13, 2026

(54) ELECTROCHEMICAL CELL DEIONIZATION SYSTEM

(71) Applicant: Robert Bosch GmbH, Stuttgart (DE)

(72) Inventors: Mordechai Kornbluth, Brighton, MA (US); Jonathan Braaten, Sunnyvale, CA (US); Bjoern Stuehmeier, Santa Clara, CA (US); Lei Cheng, San Jose, CA (US); Nicola Molinari, Cambridge, MA (US)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 18/344,080

(22) Filed: Jun. 29, 2023

(65) Prior Publication Data

US 2025/0003096 A1 Jan. 2, 2025

(51) Int. Cl.

| | |
|---|---|
| ***C25B 15/08*** | (2006.01) |
| ***C02F 1/62*** | (2023.01) |
| ***C02F 5/10*** | (2023.01) |
| ***C02F 101/20*** | (2006.01) |
| ***C25B 1/04*** | (2021.01) |
| ***C25B 9/23*** | (2021.01) |
| *H01M 8/06* | (2016.01) |

(52) U.S. Cl.

CPC .............. *C25B 15/085* (2021.01); *C02F 1/62* (2013.01); *C02F 5/10* (2013.01); *C25B 1/04* (2013.01); *C25B 9/23* (2021.01); *C25B 15/087* (2021.01); *C02F 2101/203* (2013.01); *C02F 2303/18* (2013.01); *H01M 8/0693* (2013.01)

(58) Field of Classification Search

None

See application file for complete search history.

(56) References Cited

U.S. PATENT DOCUMENTS 3,882,018 A * 5/1975 Depree .................... B01J 39/05 423/139
4,054,496 A * 10/1977 Arrathoon ................. C25B 9/73 205/636
4,490,232 A * 12/1984 Lapeyre .................... C25B 1/04 290/42
5,037,518 A * 8/1991 Young ....................... C25B 1/04 204/266

(Continued)

FOREIGN PATENT DOCUMENTS

WO WO-2022181875 A1 * 9/2022 .............. C02F 1/725

OTHER PUBLICATIONS

Saniewski et al, The Biological Activities of Troponoids and Their Use in Agriculture a Review, Journal of Horticultural Research, vol. 22, No. 1, Jun. 2014, pp. 5-19 (Year: 2014).*

(Continued)

*Primary Examiner* — Harry D Wilkins, III

(74) *Attorney, Agent, or Firm* — BROOKS KUSHMAN P.C.

(57) ABSTRACT

A hydrogen electrochemical system includes a cell including a membrane electrolyte and catalyst-loaded catalyst layers and a deionization subsystem including a selectively binding chelator binding one or more metal ions, the selectively binding chelator having pKa value(s) at which its hydrogen (s) dissociate, the pKa value(s) being different from pH value(s) of the cell in operation, the deionization subsystem being located in a water recirculation loop of the cell.

20 Claims, 9 Drawing Sheets

(56) References Cited

U.S. PATENT DOCUMENTS

| | | | | |
|---|---|---|---|---|
| 5,356,516 | A * | 10/1994 | Ashby ................ | H10N 60/0688 216/101 |
| 11,193,891 | B2 | 12/2021 | Kornbluth et al. | |
| 11,391,730 | B2 | 7/2022 | Kornbluth et al. | |
| 11,417,901 | B2 | 8/2022 | Ma et al. | |
| 11,578,415 | B2 | 2/2023 | Cave et al. | |
| 2008/0318104 | A1 | 12/2008 | Ku et al. | |
| 2018/0230606 | A1 * | 8/2018 | Han ...................... | F01N 3/0892 |
| 2019/0107183 | A1 | 4/2019 | Matsuoka | |
| 2020/0220185 | A1 | 7/2020 | Ma et al. | |
| 2020/0399149 | A1 | 12/2020 | Kim et al. | |
| 2021/0189578 | A1 | 6/2021 | Liu et al. | |
| 2021/0190695 | A1 | 6/2021 | Kornbluth et al. | |
| 2022/0018775 | A1 | 1/2022 | Kornbluth et al. | |
| 2022/0317118 | A1 | 10/2022 | Kornbluth et al. | |

OTHER PUBLICATIONS

Machine translation of WO 2022181875A1 (Year: 2022).* https://en.wikipedia.org/wiki/Crown_ether#/media/File:18-crown-6-potassium-3D-balls-A.png.

https://en.wikipedia.org/wiki/Crown_ether#/media/File:Various_crown_ethers_(molecular_diagrams).png.

https://en.wikipedia.org/wiki/Hinokitiol#/media/File:Gamma-thujaplicin.png.

https://en.wikipedia.org/wiki/Ethylenediaminetetraacetic_acid#/media/File:EDTA.svg.

* cited by examiner

ELECTROCHEMICAL CELL DEIONIZATION SYSTEM

TECHNICAL FIELD

The present disclosure relates to deionization components, systems, subsystems, and methods in electrochemical cells, specifically electrolyzers and fuel cells.

BACKGROUND

Hydrogen technology such as fuel cells and electrolyzers are becoming increasingly popular due to their ability to produce and store clean energy. Yet many challenges remain and pose a hurdle to their large-scale production. Besides the harsh environment of the fuel cells and electrolyzers resulting in material choice challenges, degradation of the components such as the catalysts and the membranes need to be resolved as the degradation affects efficiency of the hydrogen devices.

SUMMARY

In an embodiment, a hydrogen electrochemical system is disclosed. The system may include a cell including a membrane electrolyte and catalyst-loaded catalyst layers and a deionization subsystem. The deionization subsystem may include a selectively binding chelator binding one or more metal ions, the selectively binding chelator having pKa value(s) at which its hydrogen(s) dissociate, the pKa value (s) being different from pH value(s) of the cell in operation. The deionization subsystem may be located in a water recirculation loop of the cell. The pKa value(s) may differ from the pH value(s) by at least 10%. The cell may be an electrolyzer. The selectively binding chelator may include a receptor for iron ions. The selectively binding chelator may include one or more carboxylic acid (—COOH) groups or derivatives thereof. The selectively binding chelator may include one or more thujaplicins. The hydrogen electrochemical system may further include a regeneration device structured to strip the one or more metal ions after binding from the selectively binding chelator. The pH of the system may be 0-4 and the pKa value(s) may be lower and/or greater than 0-4. The deionization subsystem may be located in at least one of the catalyst layers of the cell.

In another embodiment, an electrolyzer system is disclosed. The electrolyzer system may include a water input source supplying a water input stream, an electrolyzer cell including a membrane electrolyte and catalyst-loaded catalyst layers downstream from the water input source, and a deionization subsystem. The deionization system may be located upstream from the electrolyzer cell and downstream from the water input source. The device may include a chelator binding one or more non-hydrogen ions present in the water input stream. The chelator may have pKa values different from any pH values of an electrolyzer in operation. The chelator may be deprotonated within an operating range of the cell. The chelator may have a receptor for iron ions. The chelator may include one or more carboxylic acid (—COOH) groups or derivatives thereof. The chelator may include one or more thujaplicins. The electrolyzer system may further include a regeneration device structured to strip the one or more non-hydrogen ions after binding from the chelator. The pH of the electrolyzer in operation may be about 2, and the pKa values may be greater or lower than 2.

In yet another embodiment, electrolyzer deionization device is disclosed. The electrolyzer deionization device may include a reservoir with a chelator having one or more dissociation constant pKa values greater or lower than pH values of an electrolyzer cell in operation such that a volume of protons in the electrolyzer cell remains unreduced in presence of the chelator. The chelator may be deprotonated within an operating range of the electrolyzer cell. The chelator may include one or more thujaplicins. The electrolyzer deionization device may be located upstream from the electrolyzer cell.

DETAILED DESCRIPTION

Figure 1:
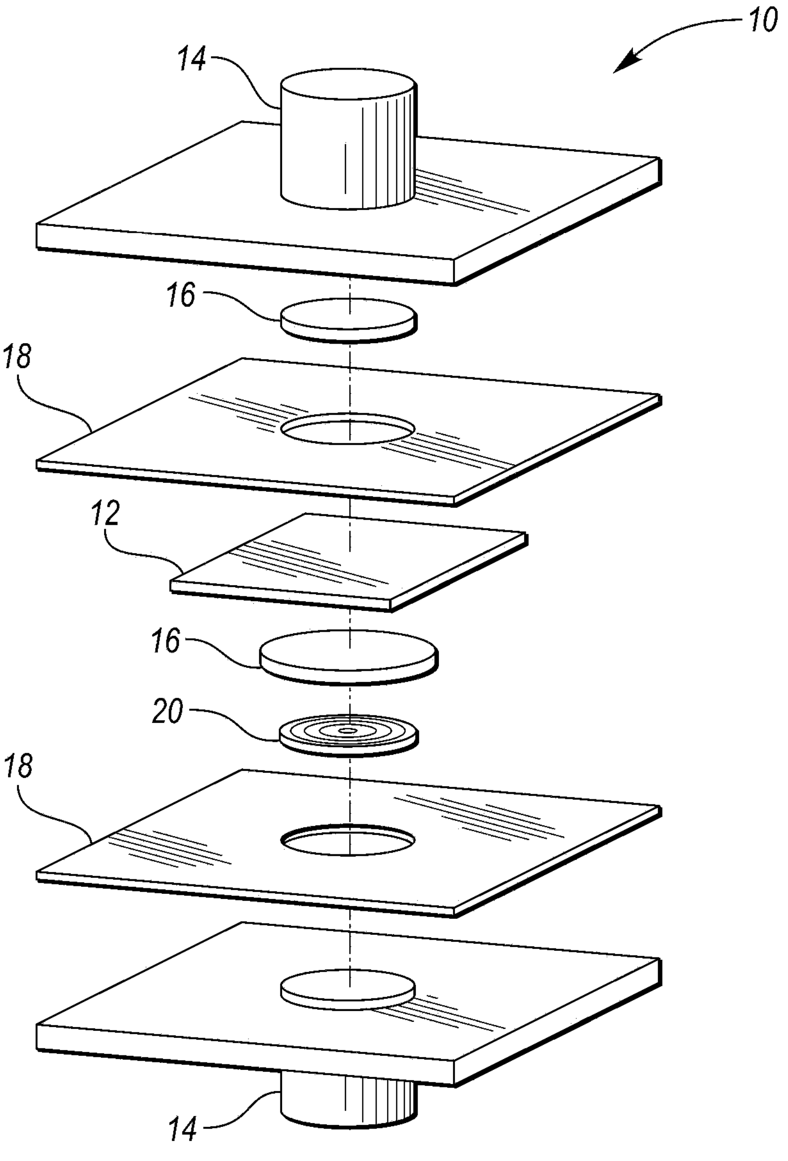
FIG. 1 is a perspective exploded view of a non-limiting example cell.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within +0%. 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Electrochemical cells such as fuel cells that convert chemical energy of a fuel (e.g. $H_2$) and an oxidizing agent into electricity through a pair of electrochemical half (redox) reactions, have become an increasingly popular technology. Fuel cells are now a promising alternative transportation technology capable of operating without emissions of either toxins or green-house gases. One of the current limitations of wide-spread adoption of this clean and sustainable technology is related to clean production of $H_2$ fuel.

A fuel cells represent an environment friendly alternative to internal combustion engines for a variety of vehicles such as cars and buses. A fuel cell typically features a relatively high efficiency and power density. A very attractive feature of the fuel cell engine are no carbon emissions, provided that the hydrogen fuel has been gained in an environmentally friendly manner. Besides being a green engine, the fuel cell may be used in other applications such as stationary and portable power sources.

The fuel cell technology; however, presents a number of challenges connected to its maintenance, sustainable performance over time, longevity, and production cost. For example, the fuel cell has a highly corrosive environment requiring materials capable of withstanding the challenging conditions. While focus is on the overall performance of the fuel cells, incremental improvements of individual components of the fuel cell are needed.

A non-limiting example of a PEMFC is depicted in FIG. 1. A core component of the PEMFC 10 that helps produce the electrochemical reaction needed to separate electrons is the Membrane Electrode Assembly (MEA) 12. The MEA 12 includes subcomponents such as electrodes (cathode, anode), catalysts, and polymer electrolyte membranes. Besides MEA 12, the PEMFC 10 typically includes other components such as current collectors 14, gas diffusion layer(s) 16, gaskets 18, and bipolar plate(s) 20.

In fuel cells, the electrolyte moves charged ions between the cathode and anode; in a PEM, the electrolyte moves protons from anode to cathode, whereas in an anion exchange membrane (AEM), the electrolyte may move hydroxide ions from cathode to anode. An organic membrane may be used as the electrolyte because it can move ions at low temperature, is cheaper than inorganic electrolytes, and it may be manufactured as a thin layer (1 μm-1 mm, typically about 5-50 μm).

Similarly, another type of an electrochemical cell, an electrolyzer, likewise uses the movement of protons through a membrane and the flow of electrons through an external circuit like a fuel cell. Hence, a proton-exchange membrane (PEM) electrolyzer stack may utilize MEA. But the direction of the reactions and the flow of energy in electrolyzers is opposite than in fuel cells. Whereas a fuel cell consumes hydrogen and oxygen to create electricity and water, an electrolyzer is an electrochemical device designed to convert electricity and water into hydrogen and oxygen.

Figure 2:
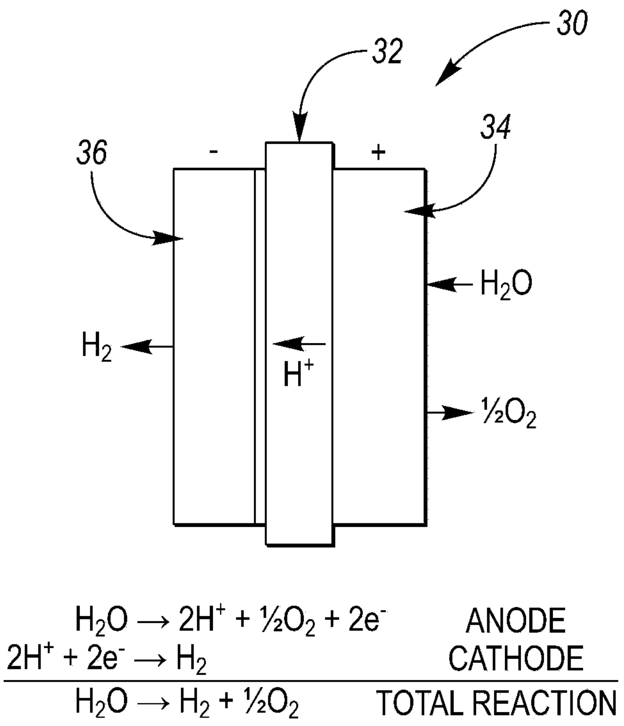
FIG. 2 is a schematic depiction of an electrolyzer and its operating principles.

A depiction of the electrolysis principle, utilized by a PEM electrolyzer, with relevant reactions is depicted in FIG. 2. The electrolyzer 30 includes the PEM 32, anode 34, and cathode 36. During electrolysis, water is broken down into oxygen and hydrogen in anodic and cathodic electrically driven evolution reactions. The reactant liquid water ($H_2O$) permeates through the anode 34 porous transportation layer (PTL) to the anode catalyst layer, where the oxygen evolution reaction (OER) occurs. The protons ($H^+$) travel via the PEM 32, and electrons (e−) conduct through an external circuit during the hydrogen evolution reaction (HER) at the cathode 36 catalyst layer. The anodic OER requires a much higher overpotential than the cathodic HER. It is the anodic OER which determines efficiency of the water splitting due to the sluggish nature of its four-electron transfer.

Different materials are used to produce the electrolyzer 30. An example of the anode PTL layer material may be titanium (Ti) and the cathode PTL layer may be carbon-based materials such as carbon paper, carbon fleece, etc. The PEM 32, anode 34, and cathode 36 may be surrounded by flow field, bipolar or separator plates which may be made, for example, from Ti, or gold- or platinum-coated Ti metals.

Catalysts are typically used on the anode 34 and the cathode 36 to assist with the half-reaction processes. The typical catalyst material on the cathode 36 is platinum (Pt) while the typical catalyst used on the anode 34 is ruthenium (Ru), iridium (Ir), Ir—Ru, ruthenium oxide ($RuO_2$), iridium oxide ($IrO_2$), or iridium-ruthenium oxide (Ir—Ru—O) due to a combination of a relatively high activity and durability.

Overall, an electrolyzer splits water into electrons, smaller ions (protons in PEM or hydroxide in AEM), and molecules (oxygen and hydrogen gas), allowing electrons to flow into the external circuit. A fuel cell creates water from hydrogen or oxygen gas, consuming electrons in the process. Often the membrane contains water, corresponding to the water generation (in a fuel cell) or consumption (in an electrolyzer). The humidified membrane typically has better ionic transport properties and higher durability than a dry membrane. The comparison reactions of a fuel cell and an electrolyzer are shown in Table 1 below:

TABLE 1

Fuel cell and electrolyzer reactions at the anode and cathode

| Type of electrochemical cell | Type of membrane | Anode | Cathode |
|---|---|---|---|
| Electrolyzer | PEM | $2H_2O \rightarrow O_2 + 4H^+ + 4e^-$ | $4H^+ + 4e^- \rightarrow 2H_2$ |
| | AEM | $4OH^- \rightarrow O_2 + 2H_2O + 4e^-$ | $4H_2O + 4e^- \rightarrow 2H_2 + 4OH^-$ |
| Fuel Cell | PEM | $2H_2 \rightarrow 4H^+ + 4e^-$ | $O_2 + 4H^+ + 4e^- \rightarrow 2H_2O$ |
| | AEM | $2H_2 + 4OH^- \rightarrow 4H_2O + 4e^-$ | $O_2 + 2H_2O + 4e^- \rightarrow 4OH^-$ |

A fuel cell and an electrolyzer may be used together to store energy via hydrogen. The electrolyzer may be utilized in applications including industrial, residential, and military applications and technologies focused on energy storage such as electrical grid stabilization from dynamic electrical sources including wind turbines, solar cells, or localized hydrogen production for industrial and other uses.

The efficiency of an electrochemical cell is closely related to the efficiency at which the ions move through the electrolyte. If it is difficult for the ions to move through the electrolyte, i.e., the ionic resistance is higher, a higher electrochemical potential is needed for a fixed current, leading to a lower efficiency. The ionic resistance of the electrolyte is approximately proportional to its thickness. It is therefore desired for the electrolyte to be as thin as possible. At the same time, the electrolyte needs to be chemically resistant to prevent or resist The deionization system of a fuel cell stack of claim 17, degradation and mechanically robust to prevent mechanical degradation during operation of the cell for the entire desired lifetime.

Figure 3:
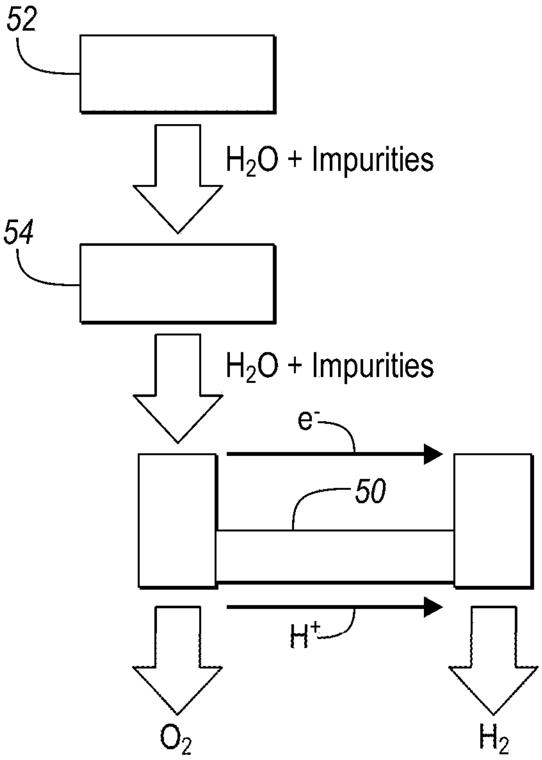
FIG. 3 is a schematic depiction of a non-limiting example electrochemical system including unwanted ions in the input stream entering the cell.

Membrane degradation may be caused by various factors. For example, one catalyst for membrane degradation are metal ions that may diffuse into the electrolytic cell. A metal ion may be surrounded by a solvation shell of water. Metal ions may originate from impurities in the input stream, dissolution of atoms from the steel components of the electrochemical device, degradation of the catalyst materials, etc. For example, if the electrochemical device is an electrolysis stack, insufficient purification of the input water may allow some ions to remain upon entry into the cell, as is schematically depicted in FIG. 3. In the figures disclosed herein, the term impurities is used to denote unwanted ions. FIG. 3 depicts an input stream from the water source 52 which may carry water and impurities in the form of ions. While the water stream travels through a purifier 54, some ions may be present and become potential source of membrane degradation.

The ions may diffuse into the membrane which may lead to side reactions and chemical degradation. A non-limiting example side reaction is oxidation of a hydroxide (OH—) ion into a hydroxyl (·OH) radical such as: $Fe^{3+}+OH^{-} \rightarrow Fe^{2+}+\cdot OH$. The hydroxyl radical is known to be a key component to many forms of membrane degradation because it is chemically reactive and therefore will attack bonds within the polymer, leading to degradation. Additional ions present in the cell may participate in electrochemical side reactions reducing the cell efficiency. Thus, there is a need to prevent Fe ions, and other undesirable ions, from diffusing into the membrane and capturing and/or passivating them if they do.

In one or more embodiments, a system is disclosed. The system may include one or more devices including an electrochemical cell. The electrochemical cell may be a hydrogen cell. The electrochemical cell may be a fuel cell or an electrolyzer, hereinafter referred to as a cell. The cell may be a membrane cell. In a non-limiting example, the cell may be a polymer electrolyte membrane (PEM) electrolyzer or an anion exchange membrane (AEM) electrolyzer. The system may further include a component for ion removal or deionization from the system. The removal may be from the water recirculation loop of the cell including, but not limited to, the input stream, output stream, catalyst layer(s), or a combination thereof.

The component may include or be part of a "recovery protocol" for the cell, device, system. Typically, the efficiency of an electrochemical cell decreases over lifetime. A "recovery protocol" is a reversal of this trend whereby the efficiency of the cell is recovered to a higher value, effectively reversing the aging of the cell. The component may be part of an operational mode of the system, subsystem, stack, device, or cell. In other words, the component may be utilized during operation.

The component may be an additive. The additive may be added to the cell, device, stack, system, or a combination thereof. For example, the additive may be an input stream additive, output stream additive, catalyst layer additive, water recirculation loop additive. The additive may be added one or more times, regularly, at predetermined intervals, during maintenance checks, or the like. The additive may be added continuously into the input stream. For example, the continuous addition may have a relatively low concentration of the additive, about or at most about 10 mml/L such as 1-15, 2-12, or 3-10 mml/L. In another non-limiting example, a higher concentration of the additive may be added during a non-continuous treatment such as an occasional addition into the input stream or cell. The amount of the additive in the non-continuous treatment may be about or at least about 10 mmol/L such as 10-100, 20-80, or 30-50 mmol/L.

The principles of the additive described herein may be applied to a capture/removal/release of any unwanted or undesirable ion such as non-hydrogen ions including, but not limited to, metal ions including iron ($Fe^{2+}$, $Fe^{3+}$), halogen ions such as chloride ($Cl^{-}$), alkali metal ions such as sodium ($Na^{+}$), alkali earth metals such as calcium ($Ca^{2+}$), magnesium ($Mg^{2+}$), manganese ($Mn^{2+}$), chromium ($Cr^{3+}$), nickel ($Ni^{2+}$), other ions such as sulfate ($SO_4^{2}$—), etc.

Figure 4:
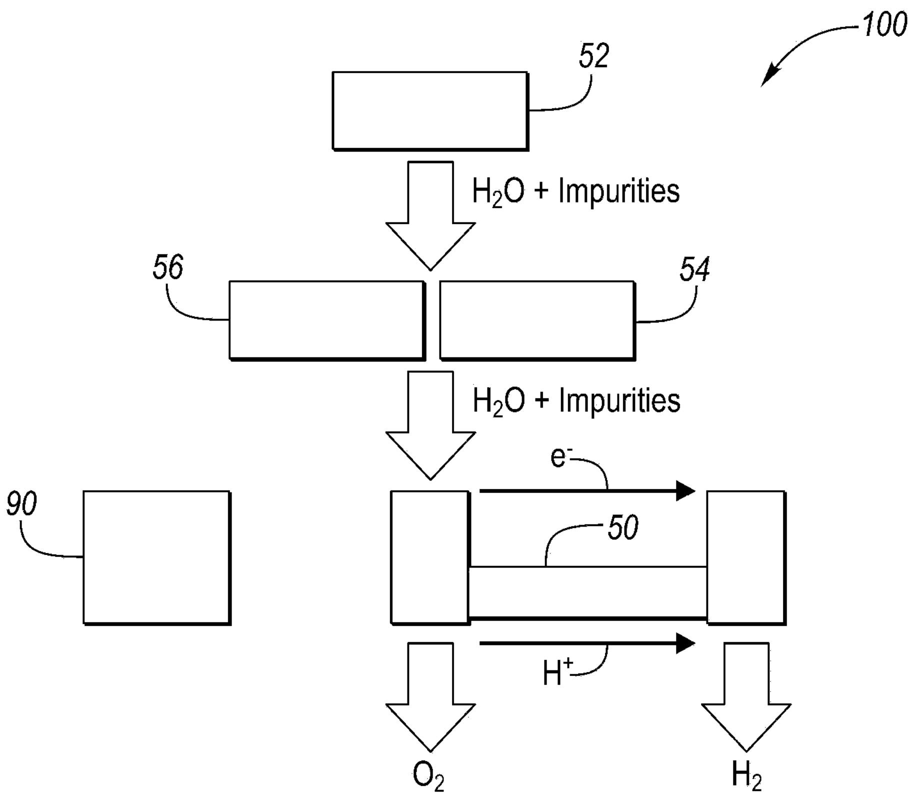
FIG. 4 is a schematic depiction of a non-limiting example electrochemical system including unwanted ions and an additive configured to capture the ions.

FIG. 4 schematically shows a non-limiting example of a system 100 including an electrochemical cell 50, source of water 52, which may bring impurities and pass through a purifier 54. The system also includes an additive source 56 distributing a predetermined amount of additive into the input stream. The additive may be added at the point of the purifier 54 or after such that the additive is added into the purified input stream downstream from the source and purifier, but upstream of the cell.

A controller 90 programmed as described herein to assist with adding, metering additive, analyzing presence, amount of ions, etc. based on input, for example from one or more sensors, is also depicted, but is optional in systems 100, 200, 300, 400, and other system described herein. The sensor(s) such as those denoted 92 may be part of the additive and/or systems, and are also optional. Placement of the controller and sensor(s) in the figures is only schematic, suggesting there presence in the system.

Figure 5:
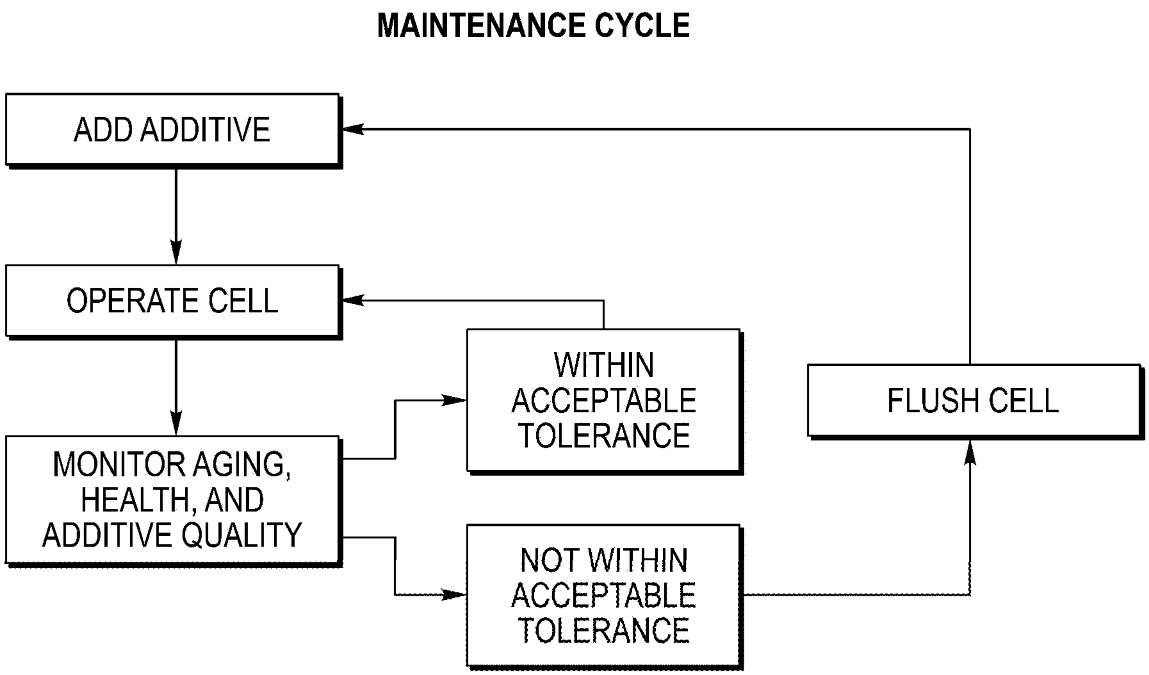
FIG. 5 is a non-limiting example of a maintenance cycle of an electrochemical cell including an additive configured to remove unwanted ions from the input stream.

FIG. 5 schematically captures a non-limiting example of a maintenance cycle. During operation, the cell may be monitored for aging, health, additive quantity, the like, or a combination thereof. If the additive concentration is within a predetermined quantity, above a threshold concentration, the cell may continue operating. If the additive concentration is below a threshold concentration or below a predetermined quantity, the cell may stop operating, be flushed, the concentration of the additive may be brought to or above a threshold amount, or a combination thereof before the cell operation continues.

The additive may include, comprise, consist essentially of, or consist of one or more compounds named herein. The compounds may include chelator(s), ionophore(s), fluorophore(s), precipitating agent(s), or a combination thereof.

The compounds may include one or more ion chelators, chelating agents, or ligands. Chelators are compounds utilizing chelation, a type of bonding of ions and molecules to metal ions. Chelation includes the formation or presence of two or more separate covalent or coordinate bonds between a ligand and a metal ion. Since metals are ions, the ions share electrons in the bond with the chelator. The electron sharing is important in the chelating mechanism in how chelators bind to metal ions. The chelator and the metal ion may share electrons mutually, both providing one electron each to form the bond, thus forming a covalent linkage. Alternatively, the chelator may be the one providing two electrons to bind the metal ion via a coordinated linkage.

Chelators are molecules including one or more specific binding sites with high affinity for and capable of binding metal ions. Chelators have a high degree of specificity for a target ion. Some chelating agents may bind to multiple types of ions.

The size, structure, spatial arrangement of atoms or steric effects, or a combination thereof may be the parameters determining how selective a chelator is towards ions. For example, a size of a ring may be a parameter. If the binding energy of the chelator is tighter (lower energy) than the solvation energy in water, the chelator is likely to take the place of water in the solvation shell.

The chelators may be configured to be selective to or have high affinity to one or more ions while not being selective to or have low affinity to one or more different ions. The chelator is thus a selectively binding chelator. For example, the chelator may be structured to be non-binding for hydrogen ions (protons) to prevent or resist disruption of cells utilizing protons such as a PEM electrolyzer. At the same time, the chelator may be configured to be metal-binding to remove unwanted metal ions from the cell. For example, the chelator may be iron-binding.

The chelator, structured to bind to metal ions, may have a selectivity coefficient, which is a numerical measure of how well the chelator can discriminate against interfering ions, or ions which are not desirable to be captured, in this case hydrogen ions. The chelator disclosed herein may have a low selectivity coefficient, meaning that the impact of the interfering ion will have minimal impact on the function of the chelator to bind metal ions. The selectivity coefficient=1 translates to equivalent responses to the metal ion and hydrogen ion, <1 means greater responsiveness to the metal ions than the hydrogen ions, and >1 means greater responsiveness to the hydrogen ions than to the metal ions. The chelator disclosed herein should thus have selectivity coefficient lower than 1.

The chelator may include a receptor configured to chelate a particular ion. The chelator may be structured to selectively capture one, at least one, or more than one ion in a single molecule or per additive molecule. The chelator may be structured to capture one meal ion in between several additive molecules.

The pKa value(s) of the chelator may be different from the pH of an operating cell. The pKa value(s) may be greater or lower than the pH of an operating cell. The values may be greater or higher by about, or at least about 10, 15, 20, 25, 30, 35, 40, 45, 50, 55, 60, 65, 70, 75, 80, 85, 90, 95, or greater %. The greater the difference between the pH value of an operating cell and the pKa value(s), the lesser chance of interference of the chelator and the hydrogen ions in the system.

For example, in a PEMFC that is typically at pH of 0-4, the chelator may be structured to not react with or chelate hydrogen ions and thus interfere with the operation of the cell, but to chelate an iron ion (for example) to prevent the ion from damaging the membrane. Even if the chelator is flushed after a maintenance cycle, it is anticipated that some chelator molecules may remain, and therefore the pKa (proton cycling) of the chelator may interfere with the electrochemical activity of the cell if the values are too close to the cell pH during operation.

Both pH and pKA relate to a system's acidity. The symbol Ka denotes the acid dissociation constant. pKa denotes an acid's dissociation. pKa is represented by the negative logarithm of Ka. Acids are categorized as weak or strong. While in aqueous solutions strong acids break down into ions, weak acids partially dissociate, resulting in a balance between the acid and its conjugate base. The dissociation of a weak acid HA may be written as follows: $HA \Leftrightarrow A^- + H^+$. The logarithm of the inverse of H+ concentration is pH.

pH denotes a system's acidity or alkalinity. pH is the concentration of hydrogen ions in an aqueous solution. pH is the property of a solution, and not a molecule. In a working water-based electrochemical cell, there may be a pH different from 7. For example, in a PEM fuel cell, the pH may be approximately 3. In a PEM electrolyzer, pH may be around 2. In an alkaline KOH-based electrolyzer, pH may be around 13. pH gives the chemical potential of hydrogen-how much energy it costs to have hydrogen ions vs. something else.

The pH value at which a chemical compound will take or donate proton is known as the pKa. pKa is a chemical property of a molecule describing at what chemical potential the hydrogen dissociates. For example, carboxylic acids (—COOH groups) have a pKa near 4. On the other hand, sulfonic acids (like a typical Nafion group) may have pKa closer to −1. The pKa thus indicates that it is a lot easier to remove the proton from a sulfonic acid group than from a carboxylic acid group. The additive may thus have pKa or the chemical potential at which the hydrogen dissociates different than a pH of the solution.

In a non-limiting example, if the additive was citric acid, suitability of the acid as an additive described herein would depend on the pH of the cell. Citric acid is a tricarboxylic acid with three carboxylic acid functional groups. The acid has three pKa values at which the four hydrogens dissociate, that is pKa=6.40, 4.76, and 3.13 (two of them are the same). If a fuel cell at pH=2 is operated, the solution will have a lot of protons. Hence, the citric acid will be fully protonated. If a cell is operated at pH=12, there will be a scarcity of protons in the solution, and the citric acid will be fully deprotonated. If a cell is operated at pH=3.13, one of the pKa values of the citric acid, the citric acid will have one proton attached on some molecules and dissociated on others. This could interfere with the cell operation, where it is desirable for the protons to move freely in the solution and not be bound to low-mobility larger molecules. By adding the citric acid, the population of mobile protons is thus reduced, which is undesirable.

The capture/release of the unwanted metal ions may further change the pKa of the additive molecules. As a result of the capture/release interaction, the molecules of the additive may oscillate between being protonated and deprotonated. That is likewise unwanted as it may limit the population of mobile protons in the cell which may interfere with the operation of the cell.

In another non-limiting example, a sulfonated tetrafluoroethylene-based fluoropolymer-copolymer has the characteristic of being a superacid catalyst due to the combination of the fluorinated skeleton. the sulfonic acid groups, and the stabilizing effect of the polymeric matrix, making it a very strong acid with pKa=−6. The copolymer is thus mostly deprotonated within an operating range of the cell. Its pKa thus does not interfere with an operating pH of a cell.

Similarly, an additive/chelator with pKa of about 4 may capture metal ions in a cell operating at pH of about 2 without a concern of deprotonation reactions.

Therefore, if pH of a non-limiting example operating cell is 0-4, the pKa of the additive should be outside of the 0-4 pH range, for example lower than 0 or greater than 4.

Alternatively, the additive may have groups which have minimal or no protonization or deprotonization.

The one or more chelators may include one or more organic compounds. The chelator may include a single molecule sized to attract a large ion. Alternatively, the chelator may include a plurality of chelators sized to coordinate around an ion to surround it.

The chelator may include an ether. The ether may be a crown ether, which is a cyclic ring containing C—O—C groups. The C—O—C groups are not likely to protonate or deprotonate. Crown ethers are cyclic polyethers with four or more oxygen atoms, each separated by two or three carbon and/or nitrogen atoms. Crown ethers have a general formula of $(OCH_2CH_2)$, or $(OCH_2CH_2CH_2)_n$. The crown ether may include 4, 5, or 6 C—O—C groups. The crown ether may include 12-crown-4, 15-crown-5, 18-crown-6, dibenzo-18-crown-6, aza-crown ether, or a combination thereof. Other crown ethers are contemplated.

The chelator may include carboxylic acid (—COOH) groups or derivatives thereof such as EDTA (ethylenediaminetetraacetic acid). EDTA has carboxyl deprotonation at pKa=0, 1.5, 2, 2.66. Some of the —COOH groups may include other ions such as sodium at the time of addition to the cell to simplify swap with undesired ions such as $Fe^{2+}$.

The chelator may include amine (—$NH_2$) groups or derivatives thereof.

The chelator may include thujaplicins (isopropyl cycloheptatrienolones) such as hinokitiol, a natural terpenoid, a tropolone derivative, containing an unsaturated seven-membered carbon ring. It is a monoterpenoid-cyclohepta-2,4,6-trien-1-one substituted by a hydroxy group at position 2 and an isopropyl group at position 4. It is an enol and a cyclic ketone derived from a hydride of a cyclohepta-1,3,5-triene. Thujaplicins and tropolones have a relatively high pKa (hinikitiol has pKa=7), above the pH operating range of most of the cells contemplated herein.

The additive may include one or more ionophores. Ionophores are a class of compounds that form complexes with specific ions and facilitate their transport across cell membranes. Ionophores may include a hydrophilic pocket or hole which forms a binding site for a particular ion. Since ionophores may reversibly bind ions, they may be reusable.

An additive with one or more ionophores structured to form complexes with specific unwanted ions may form a newly-formed metal complex which is able to pass through the membrane and leave the cell. The newly-formed metal complex may be collected in a waste stream, cleansed of the metal ion through application of an electrochemical potential, temperature gradient, or added molecules in the solution, etc. and reused. Thus, unlike the chelating agent, the ionophore may be run through a cleansing cycle and reused.

The system may be connected to a maintenance cycle that automatically adds more additive during regular maintenance, or that prompts the user to add more cleansing additive for maintenance. The additive may be drained or flushed on a regular basis. The system may include a monitoring phase/device(s)/controller(s) that monitor elements such as: the ion concentration of the stream, the proportion of additive that is reacted, the number of hours the cell has been operated, the pH of the stream, etc. The collected inputs and data may be used to flush the system, add more additive, regenerate the additive, etc.

Figure 6:
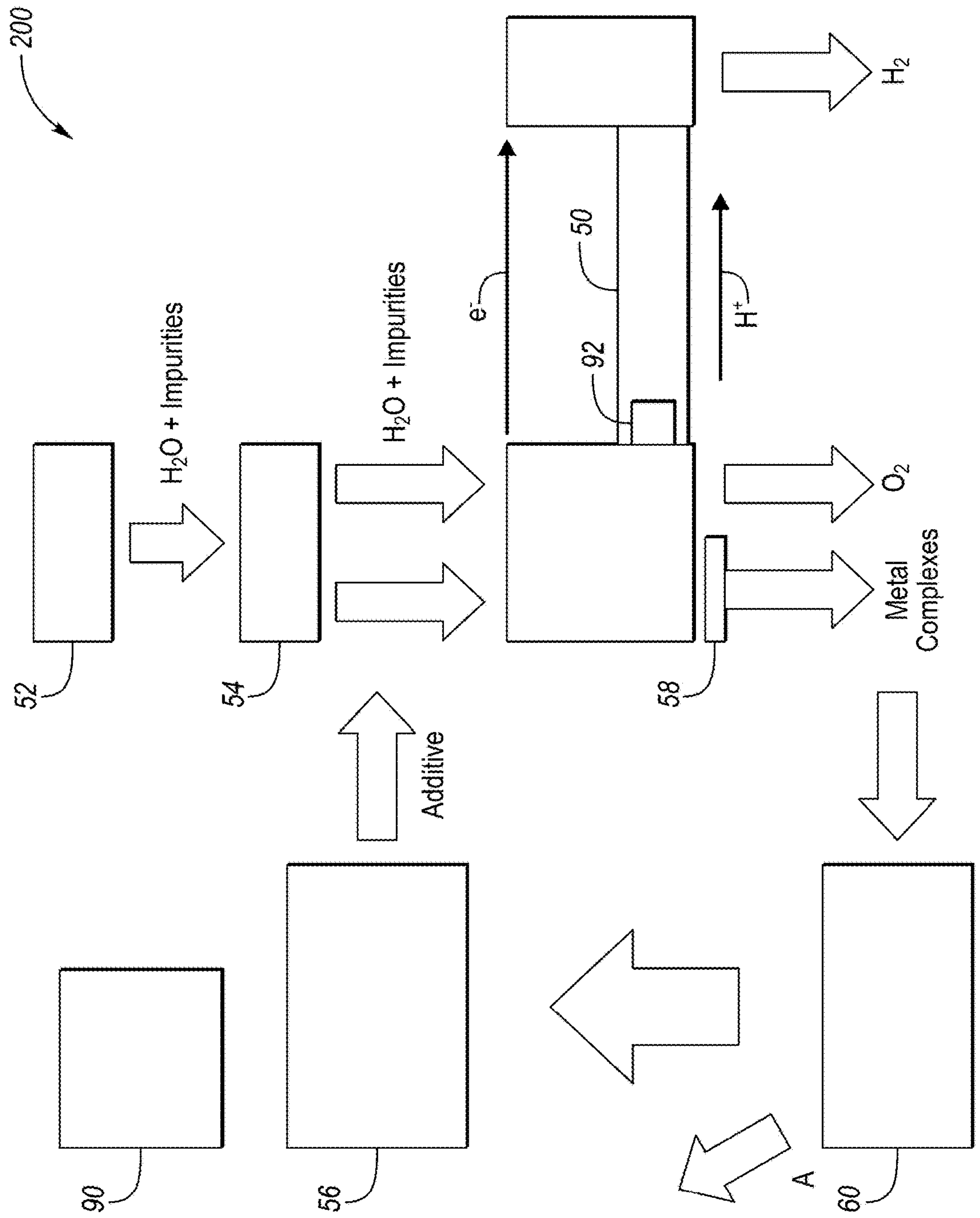
FIG. 6 is another non-limiting example system for unwanted ion removal including a reusable ionophore.

FIG. 6 schematically shows a non-limiting example of a system including a reusable ionophore. The system 200 includes a source of water 52 which may bring in input stream with impurities. The input stream may proceed to the purifier 54 and then to the cell 50. The system 200 may include an additive which may be reused, the additive may include an ionophore. The cell may include a selectively permeable membrane 58 through which a newly-formed complex of the ionophore and unwanted ion may pass. The newly-formed complex may proceed to a refresher 60 which may remove the unwanted waste containing metal ions and release them from the system at point A. The clean ionophore may proceed to an additive tank 56 from which the ionophore is added to the system as needed, predetermined, calculated, etc. The addition may be continuous, discontinuous, regular, irregular, periodical, at maintenance, at various intervals, etc.

Alternatively or in addition, the ions may be captured, neutralized, bound by one or more compounds of the additive in the catalyst layer, input stream, output stream, anywhere within the water re-circulation loop, or a combination thereof.

The system may include a sensor component which is structured to indicate, sense, measure, monitor, determine presence and/or concentration of one or more unwanted ion(s). In other words, the sensor component may monitor how many ions have entered the system, stack, device, cell, or are present in the input stream.

A non-limiting example of the sensor component may be a chemosensor. The chemosensor may include the additive with an added indicator. The indicator may include a fluorophore attached to a chelating receptor. A fluorophore is a fluorescent chemical compound configured to re-emit light upon light excitation. Fluorophores can absorb and emit light within a range of wavelengths, referred to as the absorbance or excitation and emission spectra. Thus, a fluorophore absorbs light energy of a specific wavelength. Light absorption results in excitation of the fluorophore's electrons. The fluorophore then re-emits the absorbed light energy at a different, longer wavelength, upon the electrons' return to their basic, unexcited state.

The additive may thus include one or more chelating compounds, at least some of which include a fluorophore attached to the chelating receptor via a spacer. The spacer may be an electron donating group such as an amine. The electron donating group plays an important role in the sensing mechanism. The fluorophore may be structured to be inert by default such that when light is directed toward the fluorophore, the material does not fluoresce. The effect is known as photoinduced electron transfer (PET) whereby the electron donating group quenches the native fluorescence of the fluorophore. But when the receptor is bound to a guest unwanted or analyte ion, such as $Fe^{3+}$, the charge interaction between the ion and the electron donating group such as amine will cancel the PET, activating the fluorescence, and the fluorophore molecule fluoresces when exposed to light of a particular wavelength.

The individual components of the sensing compound thus cooperate to have a first state, a second state, and a third state. The first state is a state of no electron excitation of the fluorophore when the receptor of the sensing compound is not bound to an analyte ion. The second state is a state of electron excitation of the fluorophore upon absorption of light of a first wavelength by the fluorophore electrons when the receptor is bound to an analyte ion. The third state is a state of re-emission of the absorbed light energy at a second wavelength when the electrons return to their base, unexcited state. The first and second wavelengths are different from each other.

Figure 7:
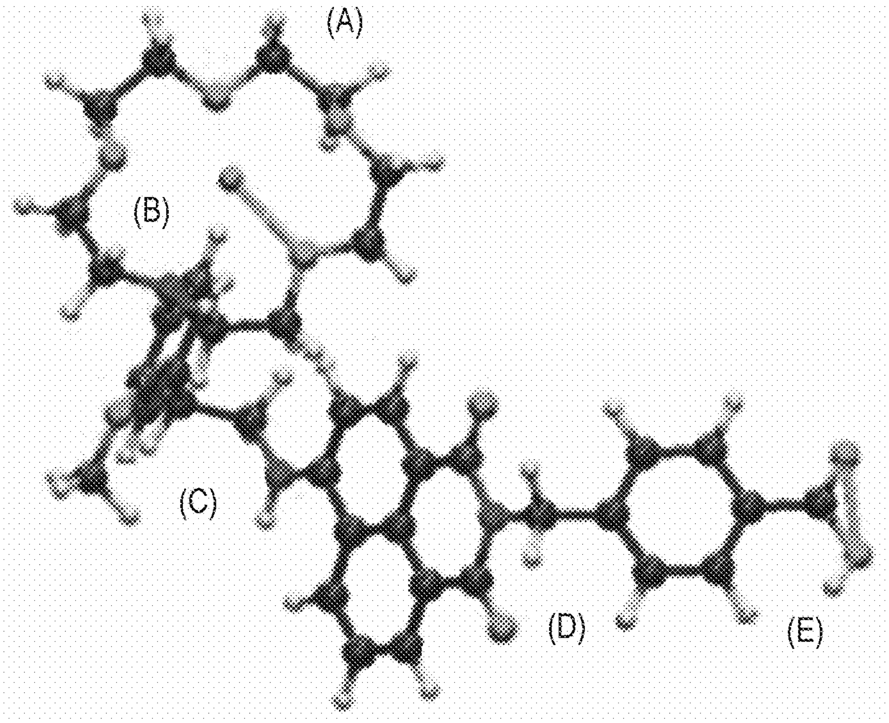
FIG. 7 is a non-limiting example chemical structure of a chemosensor disclosed herein.

A non-limiting example structure of the sensing or chemosensing component is shown in FIG. 7. FIG. 7 shows a crown ether chelator (A) with the unwanted ion (B) attached within the crown ether ring, a spacer (C) connecting the chelating receptor to a fluorophore (D) with a binding site (E).

The sensor component may include a fluorophore-receptor moiety, immobilized on a polymer surface, as described herein. A non-limiting example fluorophore may be 1,8 naphthalimide or a derivative thereof. The receptor may be a crown ether or a derivative thereof. One advantage of the disclosed sensor mechanism is that it may be optimized for a particular ion such as iron to the exclusion of other ions such as protons or hydroxides which are intended to be present in solution.

Alternatively, the sensor component may include a measurement of the overall conductance of the input or output water, to measure the overall ion content. For example, a known voltage may be applied between two electrodes in the water stream, and the current may be measured. The current is proportional to the ionic conductivity of the water, which in turn is proportional to the number of ions dissolved in the water.

The fluorophore/receptor may be immobilized on a polymer surface. The polymer may include cellulose microparticles linked with a hydrogel such as polyhema or polyurethane. The combination of fluorophore-receptor molecules, cellulose, and hydrogel may be coated on a support layer such as polyethylene terephthalate (PET), followed by drying and photo-crosslinking stage to solidify the hydrogel. The final fluorophore film may be manufactured as a thin film of about 50 μm-50 mm thickness. The film may contain one species of fluorophore-receptor pair or more than one species of fluorophore-receptor pairs.

Figure 8:
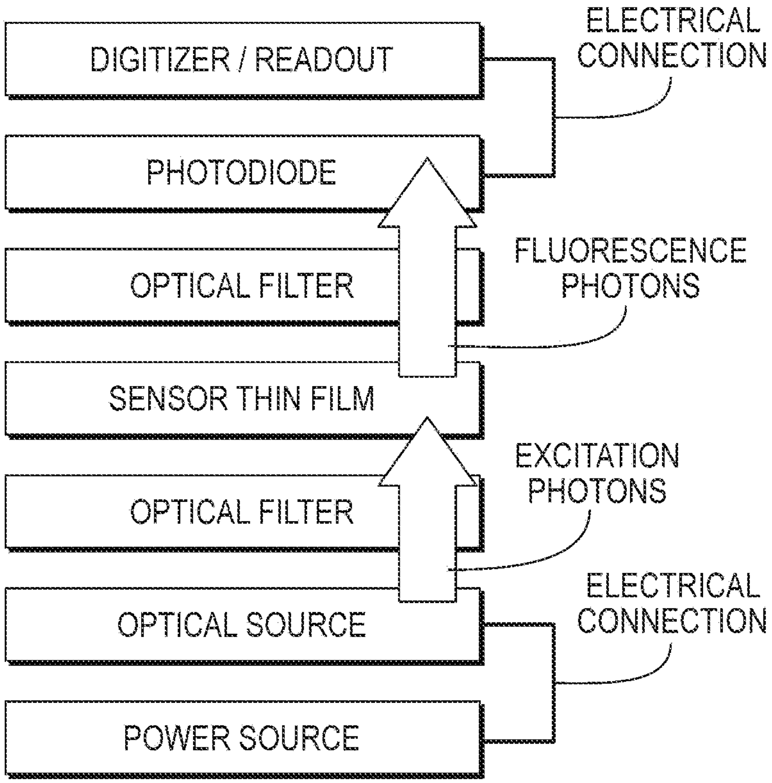
FIG. 8 shows a schematic depiction of a non-limiting example sensing device components connected to a power source and a cell.

The film may be incorporated into a sensing device. The sensing device may include an LED (e.g. blue), which creates an optical excitation of the electrons in the fluorophore. The LED emission may be optically filtered to prevent damage to the film or to enhance the signal to noise ratio. The fluorophore will fluoresce when excited, emitting light of a different frequency (e.g. green) in proportion to the concentration of ions in the solution. The emitted light may be further optically filtered to allow better signal to noise ratio or prevent confusion with the LED frequency (e.g. blue). The emitted light may be directed to a photodiode and then digitalized to provide the total ion concentration found. The sensing device may further include an electroactive polymer or optical source to induce releasing the ions from the receptors. A schematic depiction of the sensing device connected to a power source and the cell is shown in FIG. 8.

The digital signal may be further processed, using information about the manufacture of the film, lifetime to date, aging properties, etc. to extract a computed ion concentration. This may be further processed by a computing device or a controller to estimate the overall health of the electrochemical device and alert the user when a maintenance or replacement action is recommended. The measurements may be connected to a centralized hub or a controller that processes information from many such devices to predict the overall lifetime of a number of devices that may be located in the same or different places.

The system, device, or cell may thus include a sensing component including a fluorophore, a receptor, a light emitter, and a light detector. The light emitter may be structured to emit light of a specific wavelength absorbable by the fluorophore such that the light absorption results in excitation of the fluorophore's electrons. The light detector may be structured to detect light energy at the specific wavelength re-emitted from the fluorophore upon the fluorophore's electrons' return to their basic state. The sensing component may be configured such that the amount of light detected is related to or corresponds to the amount of analyte ion(s) in the input of the sensor.

The system, device, or cell may further include one or more processors programmed to measure, monitor, identify, calculate, or approximate the amount of metal ions detected by the sensor described herein and/or additional sensors. The processor may be programmed to receive input from one or more sensors, including the chemosensors described herein. The controller may be programmed to control, adjust, supply, or a combination thereof, a predetermined amount of the additive to the system, device, or cell in response to received input. The controller may be programmed to detect a signal from the light detector and correlate the input to the amount of metal ions present in the system, device, cell, input stream, output stream, water recirculation loop, or a combination thereof.

A predetermined amount may be set or be adjustable. The predetermined amount depends on the condition of the system type of input stream, type of cell component materials, age of the system, and/or other conditions. The output the electrical device provides may be a number and/or data associated with the analyte, its quantity, or other information related to the analysis. Additionally, the controller(s) may provide input to one or more devices such as the light emitter to initiate light emission, terminate light emission, or both.

In addition, or alternatively, the additive may include a precipitating agent. The precipitating agent may be an acid structured to chemically interact, react, neutralize, or a combination thereof with the unwanted ion. The acid may be a weak acid with pH of less than 7 or about 4-6, or 4, 5, or 6. It is also contemplated that a strong acid may be used, having a pH of about 1-4. The pH of the precipitating agent may thus be about 1-6 or 1, 2, 3, 4, 5, or 6. The unwanted ion thus reacts with the acidic additive to generate a neutral precipitate such as a benign salt which may be flushed out from the cell. The acid may precipitate out the ions. The neutral precipitate should be non-degrading to the membrane and/or other parts of the cell.

Weak acids are acids that do not completely dissociate in a solution. The strength of a weak acid depends on how much it dissociates. The more it dissociates, the stronger the acid. The acid dissociation constant Ka is used to calculate if an acid is a weak or strong acid. Ka is a mathematical way to express the concentration of dissociated hydrogens from an acid. The smaller the Ka, the weaker the acid. The weak acid may be an acid tailored to the chemistry of the unwanted ion(s). For example, if the input stream brings in unwanted calcium (Ca), the weak acid may be chosen as citric acid ($C_6H_8O_7$) which reacts with Ca to form calcium citrate $Ca_3(C_6H_5O_7)_2$. Other suitable weak acids may include formic acid (HCOOH), acetic acid ($CH_3COOH$), benzoic acid ($C_6H_5COOH$), hydrofluoric acid (HF), phosphoric acid ($H_3PO_4$), sulfurous acid ($H_2SO_3$), carbonic acid ($H_2CO_3$), nitrous acid ($HNO_2$), hydrocyanic acid (HCN), or hydrosulfuric acid ($H_2S$).

Strong acids, on the other hand, ionize completely in water to produce hydronium ions. The concentration of $H_3O^+$ in a strong acid solution is therefore equal to the initial concentration of the acid. A suitable strong acid may be sulfuric acid ($H_2SO_4$). nitric acid $HNO_3$, or another strong acid.

For the application described here, an acid needs to be used with certain considerations. Some acids, strong or weak, may be corrosive and degrading to an electrochemical cell environment. On the other hand, the use of an acid, especially a weak acid, may be economical due to relative abundance and cost of weak acids.

As was described above, and shown in FIG. 5, the system may be connected to a maintenance cycle that automatically adds more additive during regular maintenance or that prompts the user to add more cleansing additive for maintenance. The system may include a monitoring phase that monitors elements such as: the ion concentration of the stream, the proportion of additive that is reacted, the number of hours the cell has been operated, the pH of the stream, etc.

The additive including a (weak) acid is especially suitable for electrolyzers, specifically membrane-based electrolyzers. Electrolyzers have water input through pipes which naturally leads to release of ions into the input stream, for example from the steel pipes via which the water travels. This is distinct from, for example, fuel cells, where the input cell includes no liquid water, thus there is less opportunity for release of unwanted ions from the cell components into the input stream. The ions may attack the electrolyzer membrane, which is susceptible, as was discussed above, and which can negatively influence longevity of the cell. Additionally, the ions may attack the catalyst which may detach and result in loss of efficiency.

Due to the impurities posing a damage to the components such as the catalyst and membrane of the cells, it is typical to strive for as pure an input source as possible. It is thus unobvious to utilize ion-containing input streams. Yet, the purity requirement may be burdensome, impractical, and non-economical. The herein-disclosed additive thus offers an unobvious way to use variety of input streams without damaging the cell components.

Additionally, while the electrolyzer input water stream may include purified water, other sources of water may be utilized including tap water, rain water, and even sea water. Sea water may be characterized as water from a sea or ocean having a salinity of about, at least about, or at most about 3.5% or 35 g/L or ppm salt(s). The salt content may be about 1.5-4, 1.8-3.5, or 2.5-3.0% or 15-40, 18-35, or 25-30 g/L or ppm. If the input water is seawater, the input stream is even more ionic, and deionization techniques may not be 100% effective, especially as the stack ages. An inclusion of the additive thus improves ion removal and may prolong lifetime of the cell, device, stack, and/or system. The input water stream may have a neutral pH or about 7 or between 5.2 to 9.5.

In at least one embodiment, the component structured to capture and/or remove ions may be stationary or immobilized. Thus, instead of an additive which may be included in an input stream or output stream, the compounds configured to capture, neutralize, and/or release the unwanted ions may be immobilized on a surface. The surface may be a polymer surface. The surface may form a component within the cell, device, stack, or system. The surface may be a surface of a cell component such as the cathode catalyst layer, anode catalyst layer, or a surface upstream from the cell.

Figure 9:
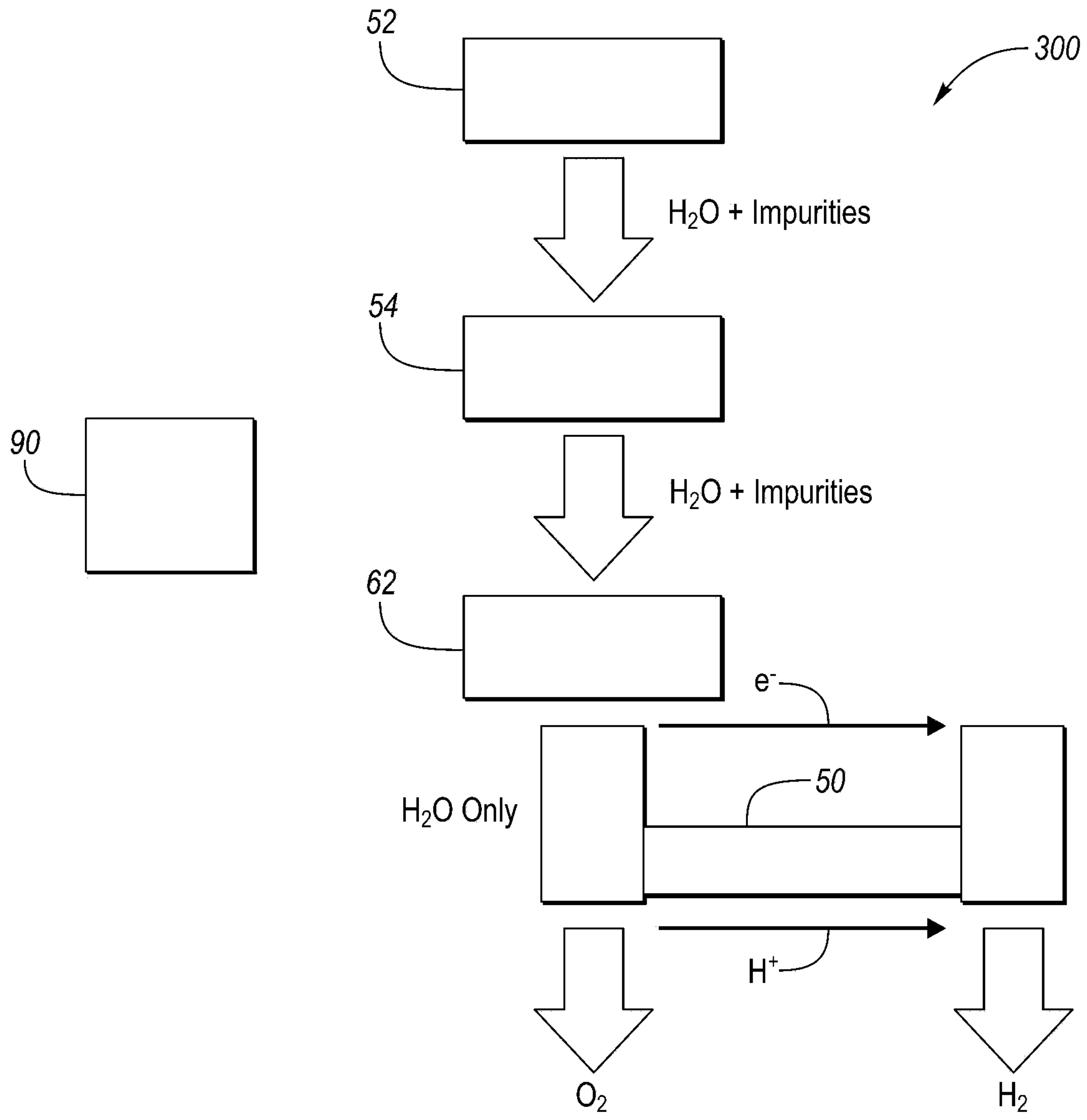
FIG. 9 is a non-limiting example system including an additive for unwanted ion removal and an ion cleanser.

In a non-limiting example, the additive may include a chelator, ionophore, or both immobilized on a surface of an ion cleanser. The ion cleanser may be located downstream from the water source, the purifier, or both, and upstream of the electrolysis cell. A schematic depiction of a non-limiting example of the ion cleanser is shown in FIG. 9. The system 300 of FIG. 9 includes the input stream source 52, a purifier 54, and a cell 50. Located upstream from the cell 50 is the ion cleanser 62 including the stationary, immobilized additive structured to capture, neutralize, or chelate unwanted ions.

The ion cleanser may be maintained on a regular basis. The cleaner may also include a refresh cycle to remove the chelated ions and allow for chelation of new ions. The refresh cycle may be activated through chemistry (e.g. washing with a solution of a specified pH), electrochemically (e.g. voltage) thermally, optically, vibrationally (e.g. with a piezoelectric or electroactive polymer), or combination thereof, to remove the chelated ions.

Figure 10:
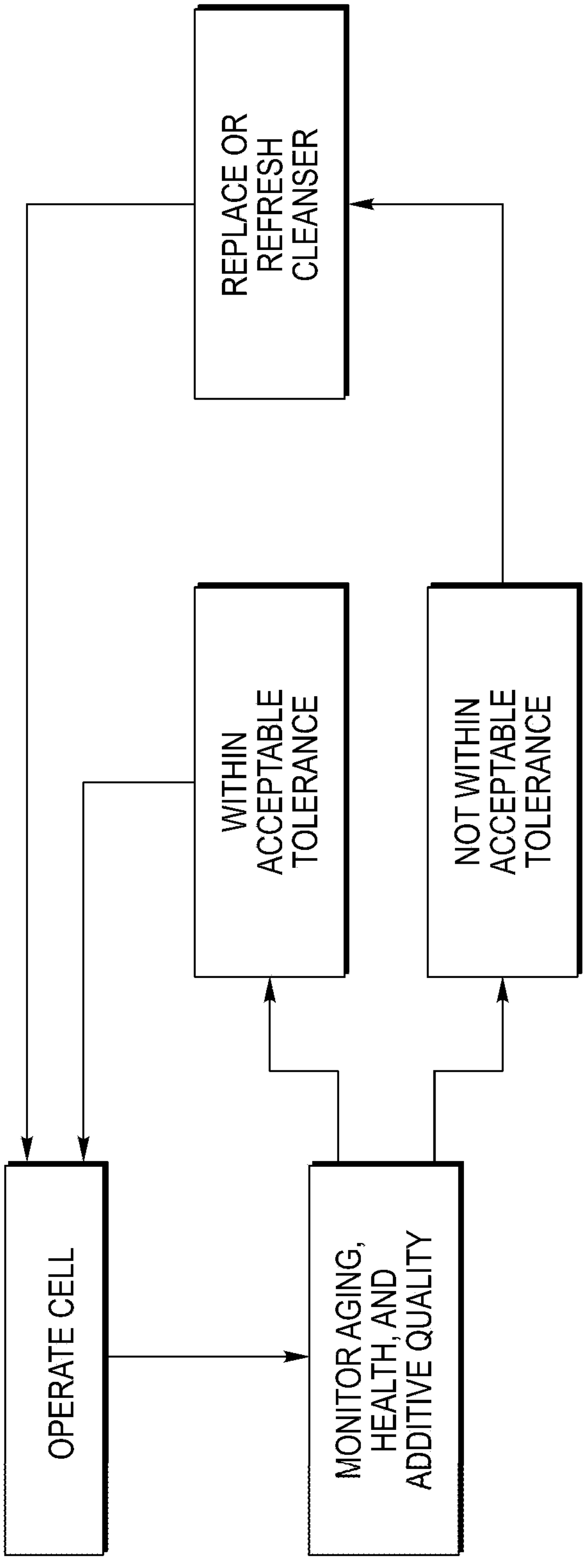
FIG. 10 is a schematic non-limiting example of a maintenance cycle of a system with an immobilized additive.
Figure 11:
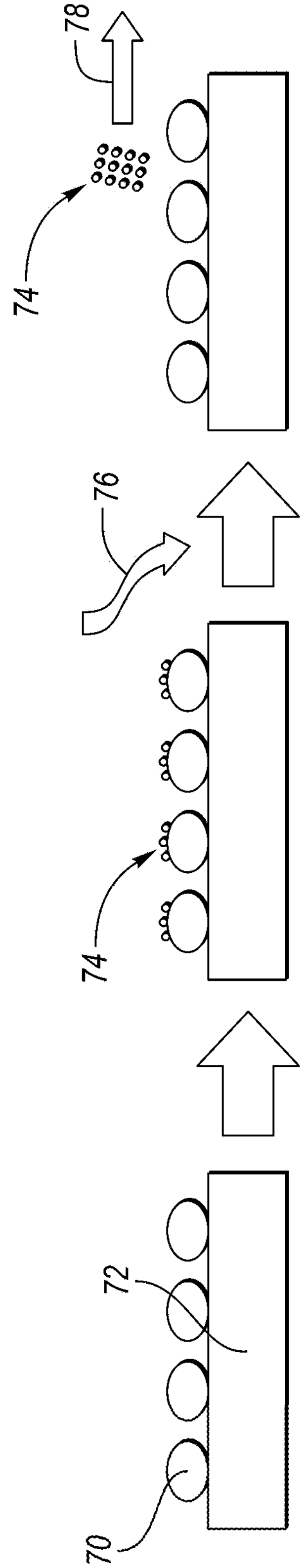
FIG. 11 is a schematic depiction of an unwanted ion capture and release according to one or more embodiments disclosed herein.

A non-limiting example of a maintenance cycle of the system including an immobilized additive is schematically shown in FIGS. 10 and 11. FIG. 11 schematically shows the chelator moieties 70 on the support 72. During the unwanted ion capture in the cell, the unwanted ions 74 are bound to the chelator moieties 70 on the support 72. During the refresh portion of the cycle, one of the types of activation 76 are used to remove the ions 74 from the chelator moieties 70. The ions 74 may be released into a waste stream 78.

Similarly to the fluorophore receptor immobilized on the polymer, the chelator/receptor may be immobilized on a polymer surface. The polymer may include cellulose microparticles linked with a hydrogel such as polyhema or polyurethane. The combination of receptor molecules, cellulose, and hydrogel may be coated on a support layer such as polyethylene terephthalate (PET), followed by drying and photo-crosslinking stage to solidify the hydrogel. The final film may be manufactured as a thin film of about 50 μm-50 mm. The film may contain one species of receptor or more than one species of the receptor. The film may be continuous or discontinuous on one or more surfaces of the cell. For example, the film may be a continuous layer on a side of the catalyst layer, the side may be directly adjacent the membrane.

Figure 12:
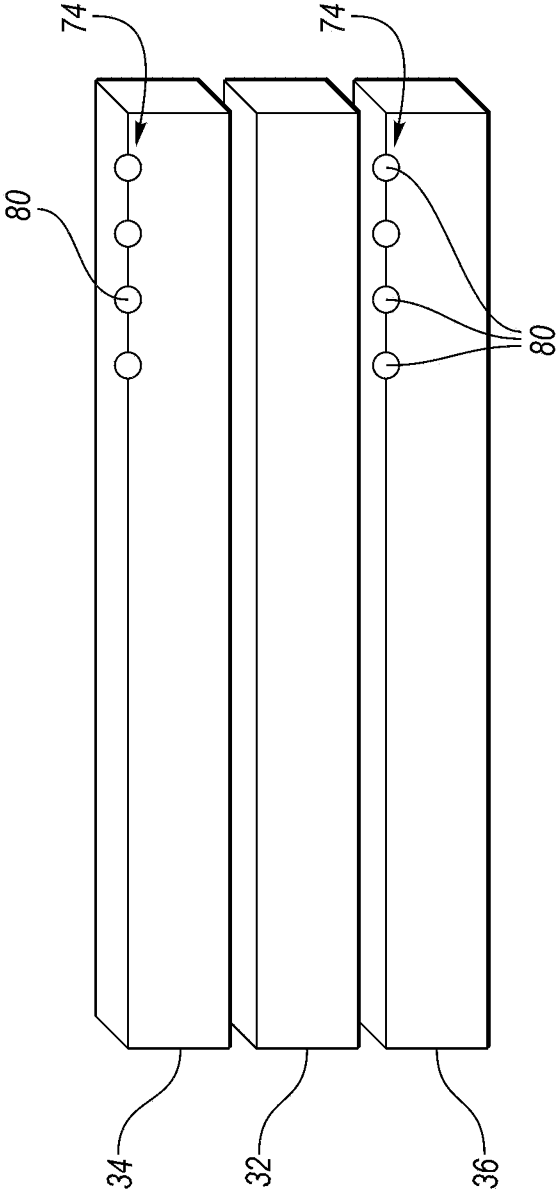
FIG. 12 is a schematic non-limiting example of the additive receptors in the cell catalyst layers.

The immobilized additive may be located upstream of the cell or within the cell. For example, the receptor may be included in the catalyst layer(s), adjacent or immediately adjacent the membrane. A schematic example of the receptors in the catalyst layers is shown in FIG. 12. In FIG. 12, the membrane 32 is surrounded by the anode catalyst layer 34 and the cathode catalyst layer 36. Both of the catalyst layers 34, 36 include receptors 80 such as chelator receptors 80 structured to capture unwanted ions 74 which may attack the membrane 32 if they are not captured.

In one or more embodiments, the system or device may include a plurality of cells. The cells may receive water from a common or shared reservoir. The reservoirs may be a tank, receptacle, or basin. The input water stream coming into the common reservoirs may have been run via a deionization device/subsystem to remove the unwanted ions. The deionization device may include the one or more additives described herein.

Figure 13:
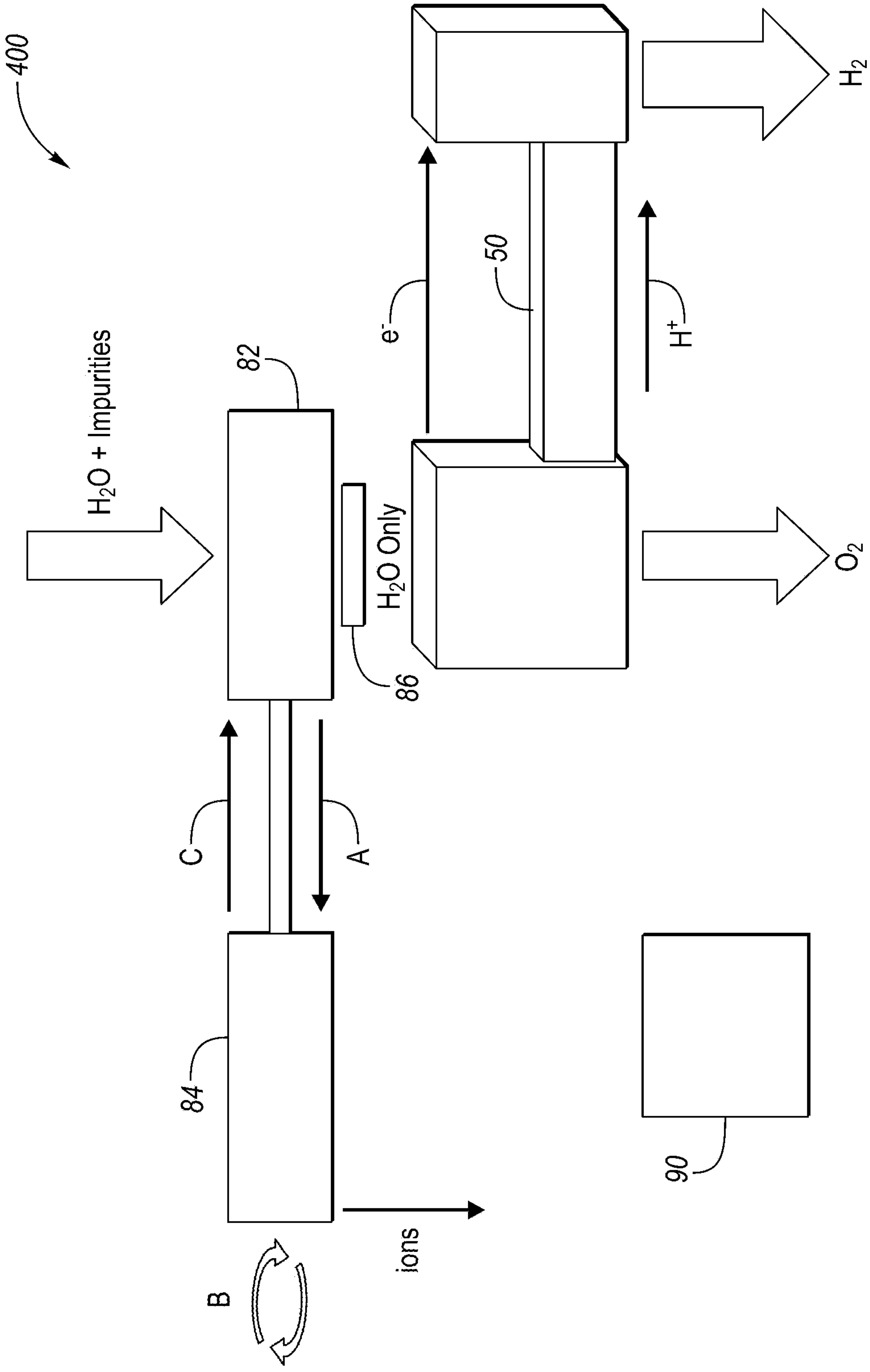
FIG. 13 is a schematic depiction of a non-limiting example system including a cell stack and a shared additive reservoir.

A schematic depiction of the system with the common additive reservoir is shown in FIG. 13. A non-limiting example system 400 depicted in FIG. 13 includes a common water reservoir 82 including an additive, as disclosed herein, which binds unwanted ions from the input stream. The system 400 further includes a plurality of cells 50, herein schematically depicted or represented as a single cell 50. Upstream from the plurality of cells is a membrane 86. The membrane 86 may be a semi-permeable, selective, or selectively permeable membrane which prevents passing of the additive+ion such as a chelator-metal complex through into the cells 50. The membrane 86 allows water molecules to pass through. A non-limiting example membrane may include a polymer such as polyhema or polyurethane with a pore size of about 1-10, 2-8, or 3-7 nm.

The additive+ion from the common reservoir 82 move into a deionization reservoir 84 via route A, where the additive is regenerated at B and the clean, regenerated additive moves back into the common reservoir via route C. The unwanted ions are flushed out from the deionization reservoir 84 and from the system 400. The regeneration step may take place chemically, thermally, electrochemically, or through any other chemical method. The deionization reservoir 84 may be located at the stack or at a different location.

A non-limiting example additive may include a short-chain polymer which may include the same backbone chemistry as the hydrogel membrane or a different chemistry. The additive may have a molecular weight (MW) between 5 and 100, 10 and 90, or 20 and 80. Greater MW could prevent the ability of the additive to diffuse adequately. Lower MW could allow the complexed additive+ion to move through the membrane which is not desirable. The additive may have sidechains that bind, capture, or electrochemically neutralize the ions in the solution. A non-limiting example may be a crown ether that binds a particular metal ion.

A method of slowing, reversing, or inhibiting aging process of an electrochemical cell is disclosed herein. The method may include providing an additive to an input stream of a cell. The method may include incorporating the additive in such amount or concentration to remove a threshold amount or concentration of unwanted ion(s) causing or potentially causing cell degradation. The method may include providing an additive with pKa or dissociation constant of a suitable additive based on a pH value or range of a cell during operation. The method may include choosing an additive which is not binding protons at a pH value or range of a cell during operation, based on its pKa value(s). The method may include providing the additive into the cell, device, or system periodically, at regular intervals, at maintenance checks, continuously, discontinuously, etc. The method may include supplying an additive forming a metal complex, passing the metal complex via a membrane into a refresher, releasing unwanted ions, and recycling or reusing the remaining additive in the system. The method may include providing an additive which is a precipitating agent, weak acid, chelating agent, ionophore, or a combination thereof.

The method may further include measuring, assessing, monitoring, detecting, or a combination thereof, of an amount of analyte ion(s) using a sensing component described herein. The method may include providing a sensing component including a fluorophore and a receptor attached via a spacer structured to have the PET such that the spacer's electron donating group quenches the native fluorescence of the fluorophore unless the analyte ion is attached to the receptor. The method may include canceling the PET when the receptor is bound to a guest analyte ion, thus activating the fluorescence such that the fluorophore molecule fluoresces when exposed to light of a particular, predetermined frequency. The method may include emitting light of a specific wavelength to excite the fluorophore's electrons. The method may include detecting light of a specific wavelength re-emitted from the fluorophore upon the electrons' return to their basic state. The method may include translating, relating, calculating, approximating the amount of detected light to the amount of analyte ion(s) present in the system, stack, device, and/or cell. The method may include one or more processors receiving input from one or more sensors. The method may include one or more processors providing input to one or more devices such as the light emitter.

The method may include removing unwanted ion(s) from the water loop of the cell by utilizing the additive compound (s) immobilized on a surface. The method may include running the input water stream via a cleanser having a surface with receptors structured to capture the unwanted ions. The method may include refreshing the cleanser by activating the detachment of the ions from the additive electrochemically, chemically, thermally, optically, or vibrationally.

The method may include using multiple cells and removing unwanted ions from the multiple cells. The removing may include having a single input stream which may contain unwanted ions. The method may include passing the single input stream via a common receptacle which may be structured as a deionization basin including the additive disclosed herein. The method may include capturing the unwanted ions with the additive in the basin. The method may further include preventing the complexed additive+unwanted ion compounds from passing downstream from the basin by providing a semi-permeable membrane, allowing water molecules through and not allowing the complexed additive+unwanted ion compounds through. The method may include regenerating the additive in a deionization reservoir, downstream from the basin. The method may include reusing the cleaned additive by passing it back to the common reservoir. The method may include releasing the ions from the system.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The following application is related to present applications: U.S. Pat. Appl. Ser. Nos. U.S. Ser. No. 18/344,073, filed Jun. 29, 2023, (RBPA 0432 PUS), U.S. Ser. No. 18/344,232, filed Jun. 29, 2023, (RBPA 0441 PUS), U.S. Ser. No. 18/344,237, filed Jun. 29, 2023 (RBPA 0442 PUS) and U.S. Ser. No. 18/344,245, filed Jun. 29, 2023 (RBPA 0448 PUS), which are incorporated by reference in their entirety herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hydrogen electrochemical system comprising:

a cell including a membrane electrolyte and catalyst-loaded catalyst layers; and a deionization subsystem including a selectively binding chelator binding one or more metal ions, the selectively binding chelator having pKa value(s) at which its hydrogen(s) dissociate, the pKa value(s) being different from pH value(s) of the cell in operation, the deionization subsystem being located in at least one of the catalyst layers of the cell and in a water recirculation loop of the cell.

2. The hydrogen electrochemical system of claim 1, wherein the pKa value(s) differ from the pH value(s) by at least 10%.

3. The hydrogen electrochemical system of claim 1, wherein the cell is an electrolyzer.

4. The hydrogen electrochemical system of claim 1, wherein the selectively binding chelator includes a receptor for iron ions.

5. The hydrogen electrochemical system of claim 1, wherein the selectively binding chelator includes one or more carboxylic acid (—COOH) groups or derivatives thereof.

6. The hydrogen electrochemical system of claim 1, wherein the selectively binding chelator includes one or more thujaplicins.

7. The hydrogen electrochemical system of claim 1 further comprising a regeneration device structured to strip the one or more metal ions after binding from the selectively binding chelator.

8. The hydrogen electrochemical system of claim 1, wherein pH of the system is 0-4 and the pKa value(s) are lower and/or greater than 0-4.

9. The hydrogen electrochemical system of claim 1, wherein the selectively binding chelator has a selectivity coefficient less than 1 for hydrogen ions relative to the one or more metal ions.

10. An electrolyzer system comprising:

a water input source supplying a water input stream;

an electrolyzer cell including a membrane electrolyte and catalyst-loaded catalyst layers downstream from the water input source; and a deionization subsystem located in at least one of the catalyst layers adjacent the membrane electrolyte of the electrolyzer cell, the deionization subsystem including a chelator binding one or more metal ions present in the water input stream, the chelator having pKa values different from any pH values of an electrolyzer cell in operation.

11. The electrolyzer system of claim 10, wherein the chelator is deprotonated within an operating range of the cell.

12. The electrolyzer system of claim 10, wherein the chelator has a receptor for iron ions.

13. The electrolyzer system of claim 10, wherein the chelator includes one or more carboxylic acid (—COOH) groups or derivatives thereof.

14. The electrolyzer system of claim 10, wherein the chelator includes one or more thujaplicins.

15. The electrolyzer system of claim 10 further comprising a regeneration device structured to strip the one or more metal ions after binding from the chelator.

16. The electrolyzer system of claim 10, wherein pH of the electrolyzer in operation is about 2, and the pKa values are greater or lower than 2.

17. An electrolyzer deionization device comprising:

a reservoir with a chelator having one or more dissociation constant pKa values greater or lower than pH values of an electrolyzer cell in operation such that a volume of protons in the electrolyzer cell remains unreduced in presence of the chelator, the chelator being disposed in at least one catalyst layer of the electrolyzer cell and configured to selectively bind one or more metal ions while remaining substantially non-binding to hydrogen ions within the pH range of the electrolyzer cell.

18. The electrolyzer deionization device of claim 17, wherein the chelator is deprotonated within an operating range of the electrolyzer cell.

19. The electrolyzer deionization device of claim 17, wherein the chelator includes one or more thujaplicins.

20. The electrolyzer deionization device of claim 17, wherein the chelator has a selectivity coefficient less than 1 for hydrogen ions relative to the one or more metal ions.

* * * * *